April 23, 1963  D. M. RUNYON  3,086,800
BALL JOINT
Filed Oct. 12, 1959
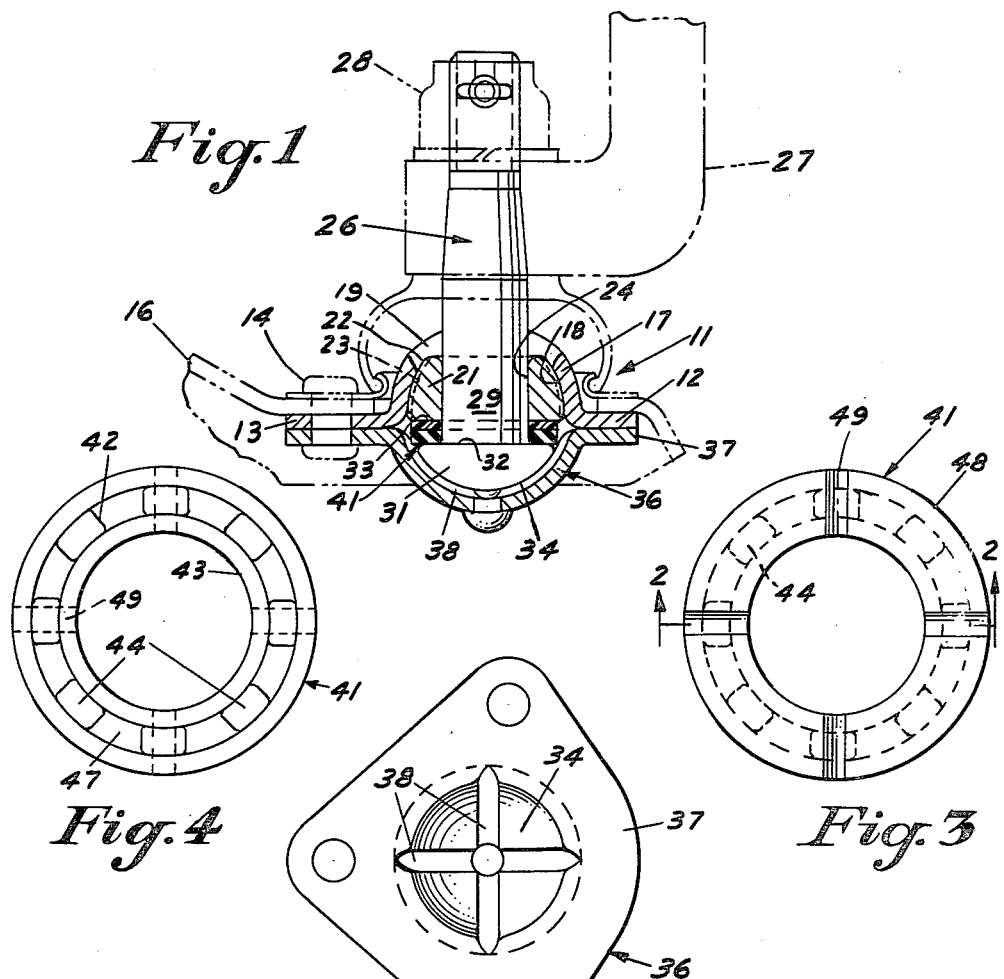
DAVID M. RUNYON
INVENTOR.
BY J. R. Faulkner
T. H. Oster
ATTORNEYS United States Patent Office 3,086,800
Patented Apr. 23, 1963

3,086,800
BALL JOINT
David M. Runyon, Dearborn, Mich., assignor to Ford Motor Company, Dearborn, Mich., a corporation of Michigan
Filed Oct. 12, 1959, Ser. No. 845,814
2 Claims. (Cl. 287—90)

This invention relates generally to ball and socket joints and particularly to a ball and socket joint utilizing a resilient thrust member to urge the parts of the joint into proper bearing relationship with each other.

Many ball joint assemblies incorporate springs as wear compensating devices to insure that the parts of the joint are maintained in bearing relationship. The present invention utilizes a resilient thrust member for this purpose. In an embodiment of the invention, a metal socket having an internal bearing surface of spherical shape receives a fragmental spherical ball member in tiltable engagement with the internal bearing surface of the socket. The ball member has a central aperture therethrough receiving the shank of a stud, the head of which is spherically shaped and engageable with the spherical internal bearing surface of a cover secured to the socket member. The head of the stud overlaps the ball member and an annular thrust member is positioned therebetween. This thrust member incorporates a resilient or elastomeric material and may also include a face portion of anti-friction material engageable with the ball member, thus facilitating rotative movement of the parts of the ball joint assembly about the axis of the stud. The resilient or elastomeric portion of the thrust washer is preloaded when assembled in the joint assembly and functions to maintain the parts of the joint in proper bearing relationship with each other. The joint is inexpensive to manufacture and troublefree insofar as maintenance is concerned, the resilient thrust member automatically accommodating variations in part sizes and providing for wear of the parts during use.

Other objects and advantages of this invention will be made more apparent as this description proceeds, particularly when considered in connection with the accompanying drawings, wherein:

FIGURE 1 is a vertical, cross sectional view through a ball and socket joint of the present invention.

FIGURE 2 is an enlarged cross sectional view of the thrust washer utilized in the joint, taken on the line 2—2 of FIGURE 3.

FIGURE 3 is a top plan view of the thrust washer.

FIGURE 4 is a bottom plan view of the thrust washer.

FIGURE 5 is a top plan view of the cover member of the joint.

Referring to the drawings, and particularly to FIGURE 1, the reference character 11 indicates a ball and socket joint assembly employed in connection with a motor vehicle front wheel suspension system. Joints of this type are also adapted for use in automotive steering linkages and the like.

A sheet metal socket 12 has a mounting flange 13 secured by rivets 14 to a suspension arm 16 of a motor vehicle front wheel suspension system. In the illustrated embodiment, the joint 11 is a lower ball joint and is mounted upon the lower suspension arm of the vehicle. The socket 12 has an integral, generally spherical socket portion 17 having an internal spherical bearing surface 18 facing the lower open side of the socket. The upper portion of the socket is formed with an elongated opening 19.

A fragmental ball member 21 having an outer generally spherical surface 22 is seated in the socket and in bearing engagement with the internal spherical bearing surface 18 thereof. The ball member 21 is formed with peripheral oil grooves 23 and with a central axially extending aperture 24.

A stud 26 is conventionally mounted upon the lower portion of a wheel spindle 27 by means of a nut 28. The stud has a cylindrical shank 29 extending through the aperture 24 in the ball member and at its lower end is formed with an integral enlarged head 31. The head 31 forms a shoulder 32 facing the lower end face 33 of the ball member in overlapping relationship. The lower surface of the stud 31 is generally spherical in shape and is in bearing engagement with the internal spherical bearing wall 34 of a sheet metal cover member 36. The peripheral flange 37 of the cover member is secured to the flange 13 of the socket member by the rivets 14. Oil grooves 38 are formed in the internal bearing surface of the cover member to permit oil circulation.

An annular thrust member 41 is positioned between the head 31 of the stud 26 and the fragmental spherical ball member 21. This thrust member is at least partially formed of resilient material under preload so as to maintain the parts of the ball joint assembly in tight bearing engagement with each other, and may also be formed with an anti-friction surface engageable with the ball member 21 to permit rotation about the axis of the stud 26 during vehicle steering movements.

Referring now to FIGURES 2, 3 and 4, which illustrate the thrust washer 41, it will be seen that the base 42 of the thrust washer has an annular portion 43 and a series of downwardly depending circumferentially spaced tabs 44 having radially inclined lower surfaces 46. These tabs 44 are separated by spaces 47.

The upper portion of the thrust washer 41 is, in the embodiment shown, formed as an annular ring 48 of an anti-friction material bonded or secured to the base 42 by a suitable adhesive. The liner 48 may, for example, be of laminated, phenolic material with a fabric base. Other suitable anti-friction materials may be used, including not only materials to be used in connection with a lubricant but also materials such as Teflon which do not require external lubricants.

The anti-friction liner 48 is slightly larger in overall diameter than the resilient base 42 and may be provided with oil grooves 49.

In assembly, the thrust washer 41 is positioned with the anti-friction upper liner 48 in bearing engagement with the lower face 33 of the ball member 21, and with the resilient base 42 in thrust engagement with the shoulder 32 formed on the enlarged head 31 of the stud 26. The arrangement is such that when the cover 36 is assembled to the socket 12, the resilient base 42 of the thrust washer is compressively preloaded to a predetermined degree. During this loading the downwardly depending tabs 44 are compressed axially. The tabs may distort circumferentially due to the clearance spaces 47 provided between adjacent tabs and may also distort radially due to clearance between the tabs and the shank 29 of the stud.

The resilient washer applies an axial force between the head 31 of the stud 26 and the ball member 21 to maintain the ball member in bearing engagement with the internal bearing surface 18 of the socket portion 17. The thrust member thus automatically compensates for manufacturing variations in the dimensional characteristics of the parts of the assembly and likewise compensates for wear during use. At the same time, axial rotative movement of the joint for steering purposes is facilitated by the anti-friction portion of the thrust washer.

The particular configuration of the resilient or elastomeric base 42 of the thrust washer may, of course, be varied without departing from the scope of the invention and variations in the structure are likewise contemplated within the scope of the appended claims.

What is claimed is:

1. A ball and socket joint assembly comprising a socket member having an internal bearing surface, a ball member in said socket member tiltable on said internal bearing surface and having an opening extending therethrough, a stud having a shank extending through the opening in said ball member and an enlarged head underlying the ball member, a cover for said socket member having an internal bearing surface adapted to engage the head of said stud, an annular thrust member between said ball member and said stud head, said thrust member having a base portion of elastomeric material engageable with said stud head and an upper portion of antifriction material engageable with said ball member, said base portion having a series of downwardly depending circumferentially spaced apart tabs engageable with said stud head and adapted when assembled in said ball and socket assembly to be compressed axially and distortable circumferentially and radially to provide a predetermined preload.

2. A ball and socket point assembly comprising a metal socket member having an internal generally spherical bearing surface facing the open side of said socket and an enlarged opening through the base of said socket, a centrally apertured fragmental spherical ball member seated in said socket in engagement with the internal bearing surface of said socket member, a stud having a shank extending through the aperture in said ball member and an enlarged head overlapping the end face of said ball member, a cover for the open side of said socket having an internal generally spherical bearing surface engageable with the spherical head of said stud and an annular thrust member encircling the shank of said stud between the head of said stud and the end face of said ball member, said thrust member comprising an axially distortable base of resilient material engageable with the head of said stud and an upper portion of antifriction material carried by said resilient base portion and in rotatable slidable engagement with the end face of said ball member, said base portion having a generally annular shape with a series of circumferentially spaced apart tabs integral therewith extending in a direction away from the antifriction material portion, said base portion being preloaded under compression to urge said ball member into bearing engagement with the internal bearing surface of said socket and said stud head into bearing engagement with the internal bearing surface of said cover.

References Cited in the file of this patent

UNITED STATES PATENTS

| | | |
|---|---|---|
| 1,920,436 | Riker | Aug. 1, 1933 |
| 2,471,672 | Booth | May 31, 1949 |
| 2,778,664 | Herbenar | Jan. 22, 1957 |
| 2,878,047 | Booth | Mar. 17, 1959 |
| 2,944,831 | Thomas | July 12, 1960 |

FOREIGN PATENTS

| | | |
|---|---|---|
| 805,116 | Great Britain | Nov. 26, 1958 |